United States Patent [19] [11] 3,953,933
Goldstein [45] May 4, 1976

[54] COVER PLATE ASSEMBLY
[75] Inventor: Edwin Goldstein, Berkeley Heights, N.J.
[73] Assignee: Dilly Mfg. Co., Inc., South Plainfield, N.J.
[22] Filed: Jan. 9, 1974
[21] Appl. No.: 432,105

[52] U.S. Cl. .................................................. 40/152
[51] Int. Cl.² .................................................. G09F 1/12
[58] Field of Search .............. 40/152, 156, 10 R, 63, 40/10; 174/66, 65; 220/241, 242

[56] References Cited
UNITED STATES PATENTS

| | | | |
|---|---|---|---|
| 1,219,864 | 3/1917 | Platt | 220/241 |
| 1,697,348 | 1/1929 | Cunningham | 220/242 |
| 1,930,610 | 10/1933 | Despard | 40/10 R |
| 2,241,263 | 5/1941 | Koppe | 40/156 X |
| 2,515,820 | 7/1950 | Clark | 40/134 |
| 2,814,894 | 12/1957 | Horton | 40/63 |
| 2,980,283 | 4/1961 | Bentsen | 220/242 |
| 3,197,549 | 7/1965 | Good | 174/66 |
| 3,314,181 | 4/1967 | Baur | 40/156 X |
| 3,437,737 | 4/1969 | Wagner | 174/65 |
| 3,437,738 | 4/1969 | Wagner | 174/65 |
| 3,473,246 | 10/1969 | Parobek | 40/63 R X |
| 3,518,356 | 6/1970 | Friedman | 174/66 |
| 3,530,230 | 9/1970 | Cormier et al. | 174/66 |
| 3,544,703 | 12/1970 | Jones | 174/66 |

FOREIGN PATENTS OR APPLICATIONS

| | | | |
|---|---|---|---|
| 1,112,311 | 11/1955 | France | 40/156 |

Primary Examiner—Louis G. Mancene
Assistant Examiner—Wenceslao J. Contreras
Attorney, Agent, or Firm—Seidel, Gonda & Goldhammer

[57] ABSTRACT

A cover plate assembly comprising first and second members. The first member is secured over an opening in which a switch operator or an electrical outlet is located. The second member comprises a decorative surface which is releasably connected to and supported by the first member. The second member can be changed at will to meet individual tastes.

18 Claims, 13 Drawing Figures

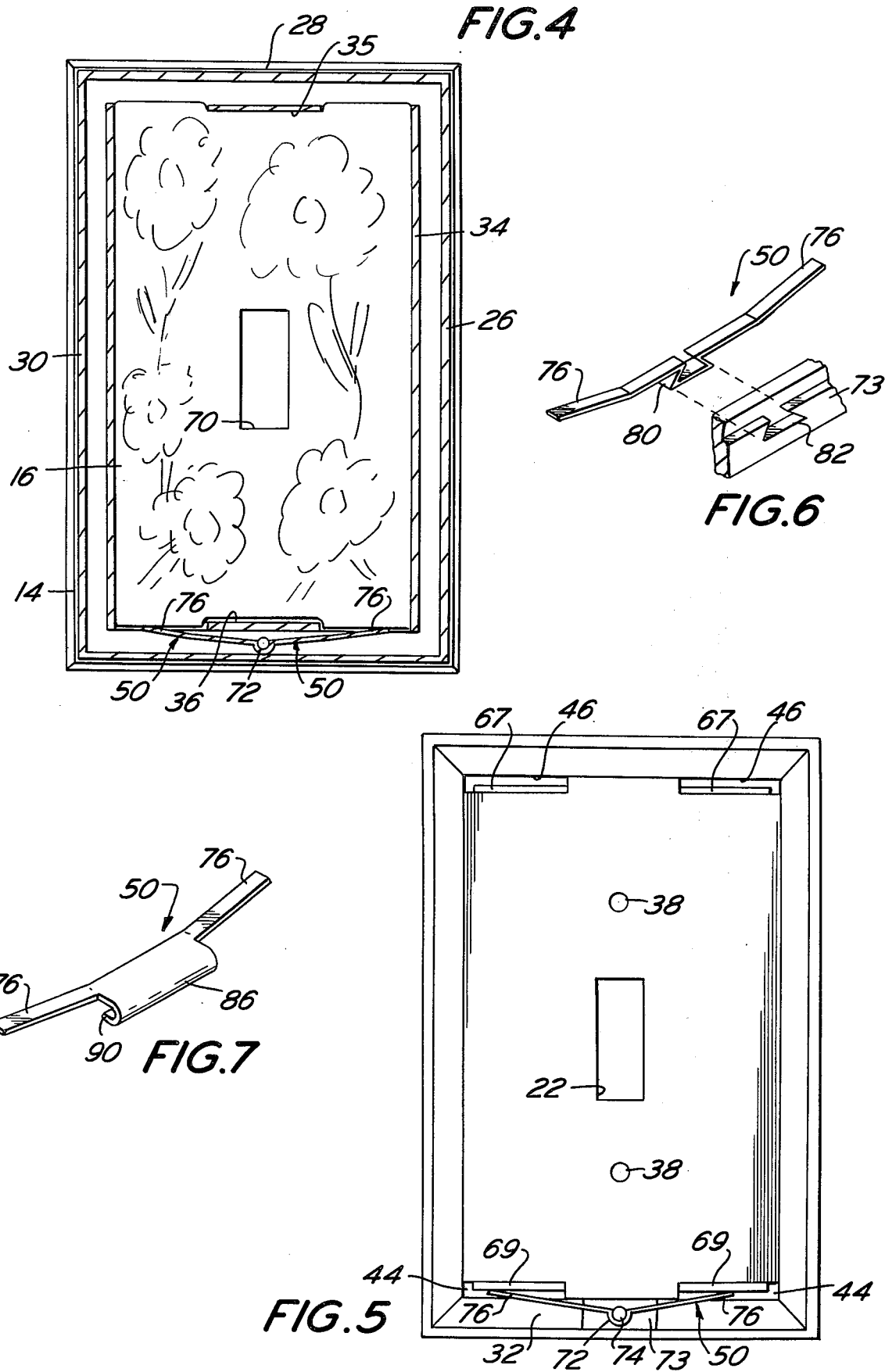

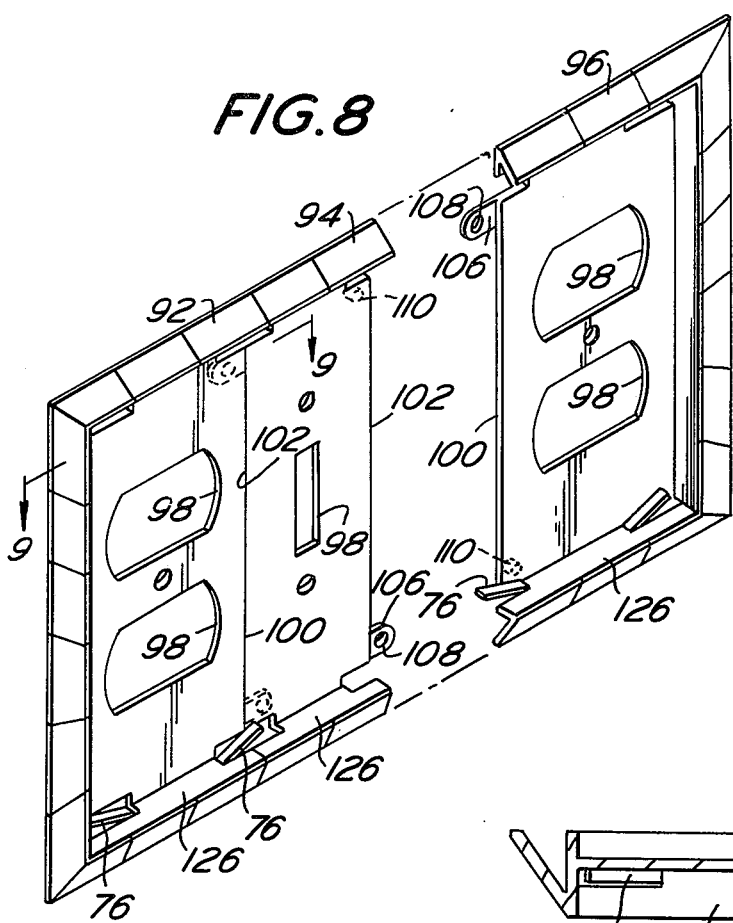
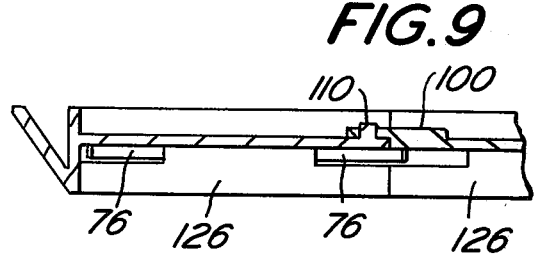
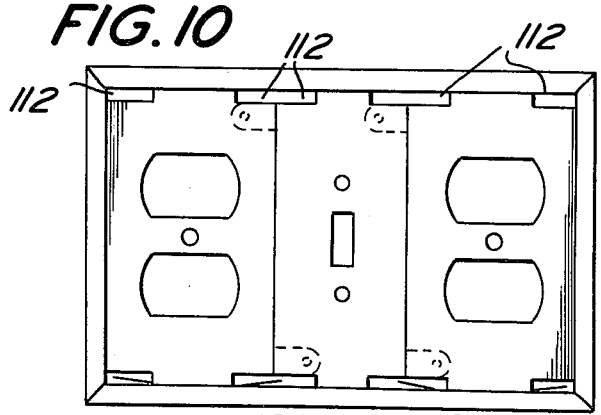
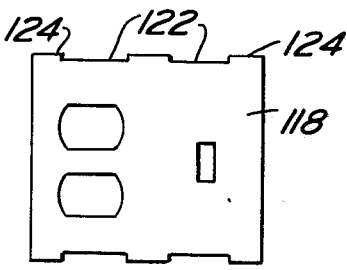
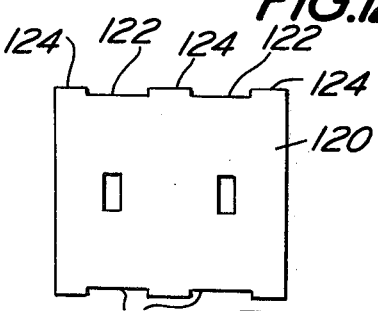
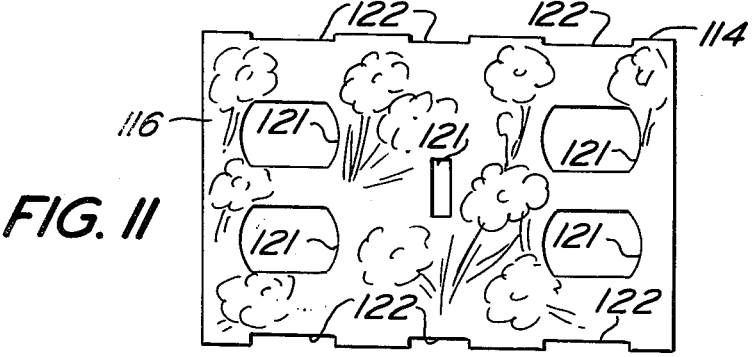

COVER PLATE ASSEMBLY

This invention relates to cover plates for switch operators and electrical outlets, and more particularly to a cover plate assembly wherein the cover plate is provided with an unblemished decorative surface that can be changed at will.

Interest has been directed toward making the cover plates for switches and outlets attractive so that they can blend harmoniously with interior designs.

To this end many cover plates which have attractive designs have been manufactured. Thus, they may give the illusion of sculptured wood, metal, stone or the like. Further, they may be designed so that they can readily fit with any furniture style such as French Provincial, Mediterranean, Early American and Modern. The cover plates usually comprise one element which is secured to the switch.

The purchaser merely has to remove the existing cover plate and replace it with the newly purchased decorative plate. However, certain disadvantages are inherent in this technique.

Thus, the purchaser must make a relatively substantial expenditure for each cover plate. Further, when a room is redecorated, the existing cover plate must be removed and a new cover plate purchased. In order to remove the cover plate it is necessary to remove at least one and possibly two screws which are standard on electrical switches and outlets. Further, the visual appearance of the screws is distasteful and tends to destroy the aesthetic beauty of the plate.

The present invention seeks to obviate these disadvantages by providing a new concept in cover plates wherein the cover plate is an assembly of two members. Each of the members has an aperture through which the elements of a switch or outlet can extend. The first member includes wall portions having facing surfaces thereon. The second member is supported on the first member. The second member is provided with a plurality of notched edges. A portion of each of the edges are adjacent each of the facing surfaces of the first member. Resilient means is disposed between the first and second members for resiliently and releasably urging the second member against one of the facing surfaces of the first member so that the second member is releasably retained on the first member with the apertures being aligned.

For the purpose of illustrating the invention, there is shown in the drawings certain forms which are presently preferred; it being understood, however, that this invention is not limited to the precise arrangements and instrumentalities shown.

FIG. 4 is a sectional view taken along line 4—4 of FIG. 3.

FIG. 5 is a sectional view taken along line 5—5 of FIG. 3.

FIGS. 6 and 7 are perspective views of alternate forms of resilient retaining means used in the presently preferred form of the invention.

FIG. 8 is a partially exploded perspective view of a second presently preferred form of the invention.

FIG. 9 is a sectional view taken along line 9—9 of FIG. 8.

FIG. 10 is a front view of the member illustrated in FIG. 8.

FIG. 11 is a front view of another member comprising the second presently preferred form of the invention.

FIGS. 12 and 13 are front views of still a portion of a further form of the invention.

Figure 1:
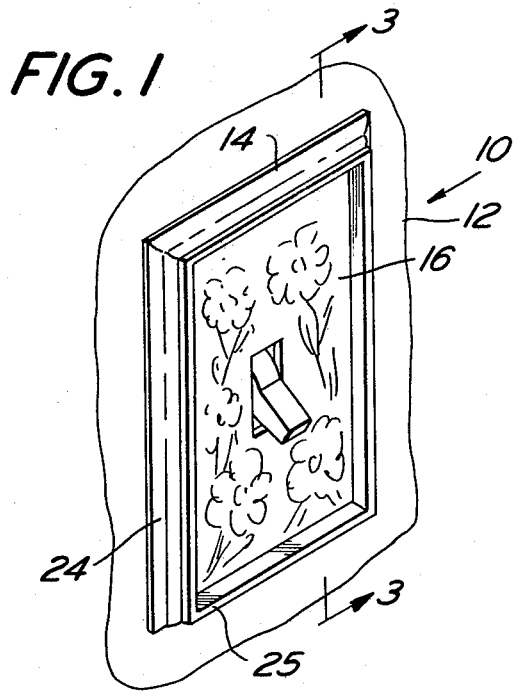
FIG. 1 is a perspective view of a cover plate assembly constructed in accordance with one form of the invention.
Figure 3:
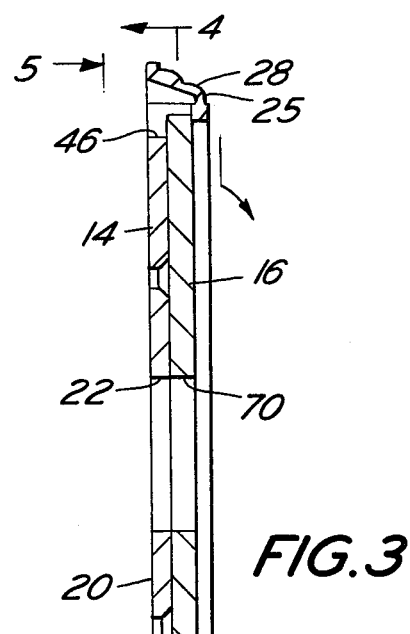
FIG. 3 is a sectional view taken along line 3—3 in FIG. 1.

Now referring to the drawing for a detailed description of the invention, a cover plate assembly 10 illustrated in FIG. 1 is mounted on a suitable surface such as a wall 12.

The cover plate assembly comprises a first member 14 and a second member 16.

The first member 14 may be die cast or otherwise made from suitable metal or can be molded plastic. It includes a base plate 20 having a centrally positioned aperture 22 through which a switch operator can extend.

Its periphery may be defined by a frame 24 which is hollow and generally U-shaped in cross section, the bight of the U being designated by reference numeral 25.

As illustrated in the drawing in connection with a rectangular base plate, the frame has four sides, namely, 26, 28, 30 and 32. Sides 26 and 30 are opposite each other while sides 28 and 32 are opposite each other.

The inwardly facing legs of the U may define facing wall portions 34 on sides 26 and 30. In like manner the inwardly facing legs of the U may define inwardly facing wall portions 35 and 36 on sides 28 and 32, respectively.

The outwardly facing legs of each of the U-shaped sides 26, 28, 30 and 32 may be provided with an interesting and decorative scroll work or any other desired aesthetically pleasing designs such as illustrated in the drawings.

The base plate 20 is provided with openings 38 which are disposed on opposite sides of the aperture 22 so that screws received therein can be secured to corresponding openings 40 in conventional switch 42.

Portions of wall 36 may be cut away to form openings 44 so that portions of a resilient retaining means 50 can extend into the area defined within frame 24. Portions of wall 35 may be cut away to form openings 46 for receiving projections on the second member 16 as hereafter explained.

Figure 2:
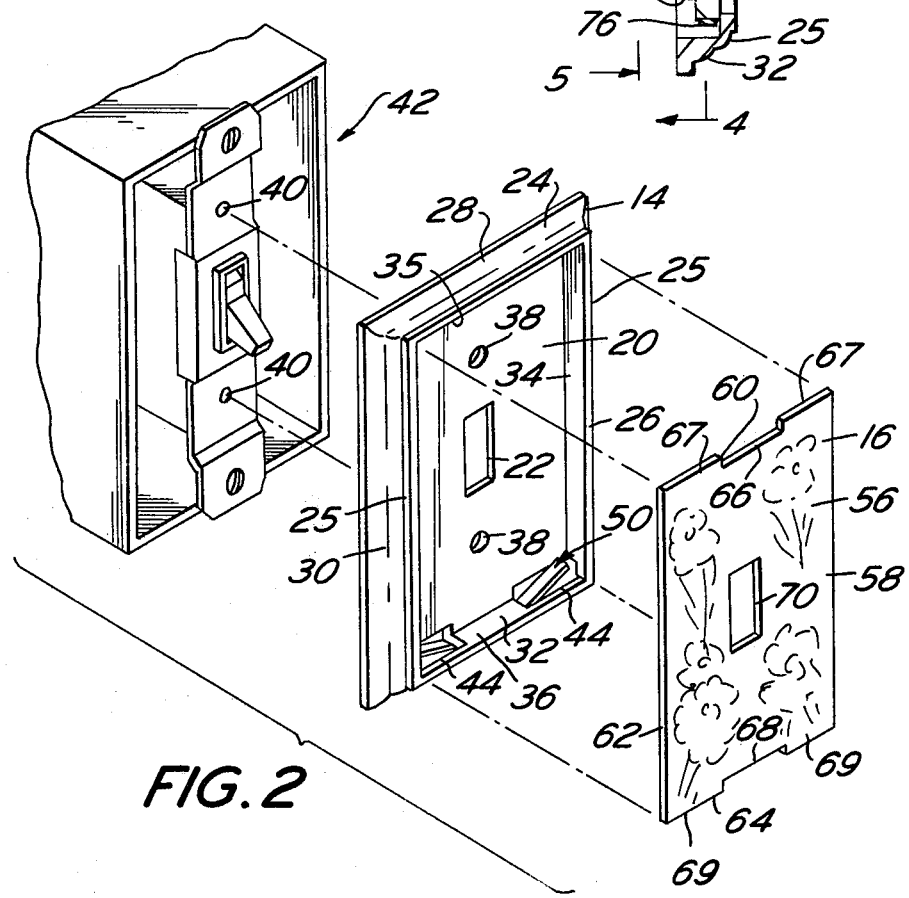
FIG. 2 is an exploded perspective view of a cover plate assembly illustrated in FIG. 1.

The second member 16 may have any convenient shape. In the preferred embodiment, member 16 corresponds to the area defined within frame 24. Thus, as illustrated in FIG. 2 the second member 16 is a relatively flat element having a planar outer surface 56 on which a decorative design may be placed. It includes edges 58, 60, 62 and 64. Alternatively, member 16 may have an ornate or high relief design on surface 56.

Edges 58 and 62 are opposite each other. Edges 60 and 64 are opposite each other. The edges define a shape, for example, in this instance, generally a rectangle which corresponds to the shape defined by frame 24. At an intermediate portion of edges 60 and 64, a portion of the member is cut away to define notches 66 and 68 and projections 67 and 69. The second member includes an aperture 70 through which an element such as an on-off light switch operator can extend.

Referring now to FIGS. 4–7 a number of means are disclosed for supporting the resilient retaining means

50.

Thus, in FIGS. 4 and 5 the resilient retaining means 50 is seen to be an elongated leaf spring. At its midportion the leaf spring comprises an arcuate shaped portion 72. A pin 74, which may be formed integrally with a boss 73, extends rearwardly from side 32 in the U of the frame. The arcuate shaped portion 72 of the leaf spring may be snapped over pin 74. The legs 76 of the leaf spring now extend through the openings 44 in wall 36.

In the alternative, a construction such as that illustrated in FIG. 6 may be employed. Thus, the midportion of the leaf spring may be bent to form a first locking member such as the dovetail 80. A corresponding dovetail opening 82 is formed in the boss 73.

A further alternative for the leaf spring construction is illustrated in FIG. 7 where the intermediate portion of the spring comprises an enlarged tab 86 which has its distal end 90 doubled back on itself to form a resilient clip. The clip is then inserted between the outer and inner walls of side 32 so that the ends of the spring clip extend through openings 44.

Both the first and second members of the cover plate assembly can be readily installed over a wall switch or receptacle.

Thus, the existing cover plate is removed and the first member is mounted on the switch 42. This is accomplished by merely inserting screws through openings 38 and 40. With the first member installed on the wall the cover plate can now be installed without the use of any tools. Thus, all that need be done is to insert the projections 69 on the bottom edge 64 of member 16 into the openings 44 so that the bottom of notch 68 bears against wall portion 36 and the projections are forced against the bias of resilient means 50.

This provides sufficient clearance for edge 60 and projections 67 thereon to be slipped alongside wall portion 35 on side 28. When the downward pressure on the second member 16 is released the second member will move upward slightly as a result of the bias provided by resilient means 50 so that the bottom of notch 66 bears against wall portion 35 on side 28 and the projections 67 are received in openings 46 in upper wall portion 35. Apertures 70 and 22 will be aligned with each other to permit ready access to the switch operator.

Member 16 may be removed from within frame 24 by inserting a knife blade between the two members in order to force the projections 67 out of the openings 46 to force projections 69 against the action of resilient means 50 so that member 16 can be pivoted out of engagement with member 14.

If desired, the configuration of edges 60 and 64 can be made non-symmetrical and the wall portions 35 and 36 can be made to correspond to the non-symmetrical configuration. Thus, a keying arrangement may be created whereby the second member 16 can only be installed in the correct position. However, it is presently preferred that a completely symmetrical arrangement be provided so that there is no definite "top" or "bottom" of member 16. Further, it is readily apparent that openings 22 and 70 could be formed in any desired shape, such as to accommodate a conventional receptacle, without departing from the spirit or scope of this invention.

It should be appreciated that once the first member 14 is mounted on the wall, an infinite number of second members 16 can be mounted thereon and removed with a tool no more complicated than a fingernail or a knife. Further, while the first and second members have been shown to be rectangular in configuration it should be apparent that any convenient configuration could be used without departing from the spirit and scope of the invention. In like manner, it should be clear that resilient retaining means other than the leaf spring illustrated could be used.

Still further, while this form of the invention has been illustrated and described with relatively planar members comprising the first member and second member, it should be apparent that bulbous, or rounded members could also be employed. The sole governing factor with respect to the extent to which the member extends from the wall is whether the switch operator or receptacle outlet can be reached through apertures 22 and 70. Obviously, it may be desirable in certain instances to pull the switch operator or outlet receptacle forwardly out of the wall so that it can be accessible through the apertures 22 and 70 if such apertures are employed in curved elements.

The foregoing form of the invention lends itself readily to modular enlargement in order to cover multiple cover plate assemblies wherein more than one switch operator or more than one outlet receptacle, or combinations of switches and receptacles are provided. In this regard attention is directed to FIGS. 8 through 13 wherein a plurality of modular assemblies is shown.

In FIG. 8 a plurality of first members are shown. For the sake of discussion each first member will be identified by a separate numeral. Thus, members 92, 94 and 96 are shown. Member 92 can be characterized as a left-side member, member 96 can be characterized as a right-side member and member 94 can be characterized as an intermediate member. While the members are shown to have particular types of apertures 98, it is clear that the apertures can be shaped to fit any convenient receptacle outlet arrangement or any convenient switch operator arrangement.

Furthermore, it should be noted that members 92 and 96 are identical. Thus, if either one of these members is inverted it takes on the configuration of the other. Thus, a description of member 92 is considered to be sufficient in order to describe both members 92 and 96. Accordingly, member 92 is constructed similarly to first member 14. The primary difference between them is that one of the elongated side wall portions, e.g., side wall 26, is deleted so that an edge 100 is formed.

The intermediate portion 94 is also constructed similarly to first member 14. However, it does not have one set of side walls, but, rather has edges 100 and 102. Further, the intermediate member may have, if desired, a resilient member. In the alternative, the resilient member may be deleted from portion 94 as illustrated. Each of the members 92 and 96 has one outwardly extending lug 106 having an opening 108 therein whereby it receives a pin 110 on the rear wall of the next adjacent member. Thus, a plurality of such members, or modules, can be assembled together.

For example, in FIG. 8 a number of intermediate members 94 could be placed between members 92 and 96 to provide a cover plate assembly of substantial length. In the alternative, intermediate member 94 can be deleted so that only members 92 and 96 comprise the cover plate assembly. It should be apparent that no tools are required for assembling these members together since pins 110 are readily received in the openings 108 in lugs 106.

The assembled members are illustrated in FIG. 10. It should be noted that a plurality of openings 112 are formed. The openings serve the same function as the openings 44 and 46 on first member 14 (FIG. 2).

Further, it should be noted that the resilient retaining means extends upwardly through the openings in order to releasably retain the second members.

In this regard, FIGS. 11, 12 and 13 illustrate suitable second members 116, 118 and 120. The second members have apertures 121 therein which correspond to the apertures 98 in the first members. Further, one of the surfaces of members 116, 118 and 120 has a decorative design thereon or is treated in a fashion described above in connection with second member 16.

Each of the second members illustrated in FIGS. 11, 12, and 13 have notches 122 and projections 124 formed in their opposite edges. The notches bear against the wall portions 126 and the projections are received in the openings when the members 116, 118 or 120 are installed in the first members.

While the invention has been described with reference to certain specific forms thereof, it is apparent that many other forms will be obvious to those skilled in the art in view of the foregoing description. Thus, the scope of the claims should not be limited by that description but, rather, only by the scope of the claims appended hereto.

I claim:

1. A cover plate assembly comprising first and second members, each of said members having an aperture through which an element can extend, said first member including wall portions having facing surfaces thereon, said aperture being disposed between said facing surfaces, said second member having at least two opposite edges and being supported on said first member with a portion of each of said opposite edges adjacent each of said facing surfaces, and resilient means disposed between said first and second members for resiliently and releasably urging said second member against one of said facing surfaces so that said second member is releasably retained on said first member with said apertures being aligned.

2. A cover plate assembly as defined in claim 1 wherein said resilient means is a spring, said spring being supported on one of said members.

3. A cover plate assembly as defined in claim 1 including first interlocking means on said first member, second interlocking means on said second member, and said first and second interlocking means being in engagement with each other to prevent relative movement of said second member with respect to said facing wall portions.

4. A cover plate assembly as defined in claim 1 wherein at least one of said wall portions has at least one opening therethrough, said first member including means for supporting a spring, said means being disposed outwardly of said wall portion, said resilient means comprising an elongated spring, a first portion of said spring being connected to said supporting means and another portion of said spring extending through said opening to engage said second member.

5. A cover plate assembly as defined in claim 4 wherein said supporting means comprises a pin, said pin being supported on said first member outwardly of said wall portion, said wall portion including two openings, an intermediate portion of said spring being coupled to said pin, and the ends of said spring extend through said openings.

6. A cover plate assembly as defined in claim 4 including a second wall portion outwardly spaced from one of said facing wall portions, said supporting means being coupled to an intermediate portion of said spring and being disposed between said one facing wall portion and said second wall portion so that the ends of said spring extend through said openings.

7. A cover plate as defined in claim 6 wherein said supporting means is generally "U" shaped, and one of the legs of said "U" comprises said intermediate portion of said spring.

8. A cover plate assembly as defined in claim 4 wherein said supporting means includes a first interlocking element on said first member, an intermediate portion of said spring being shaped to define a second interlocking element, and said first and second interlocking members cooperate to support said spring.

9. A cover plate assembly as defined in claim 1 comprising another first member, each of said first members having sides in abutting engagement with each other, means interconnecting said first members to retain said abutting sides in abutting engagement, said second member having a second aperture and extending over both of said first members, and resilient means disposed between said another first member and second member for resiliently and releasably urging said second member against one of said facing wall portions on said other first member so that said second member is releasably retained on said first members with said apertures in said second member being aligned with the aperture in each of said first members.

10. A base plate for use in a cover plate assembly comprising a member defining a surface, said surface having an aperture through which an element can extend, said member including wall portions having facing surfaces thereon, said aperture being disposed between said facing surfaces, at least one of said wall portions having an opening therethrough, and means for supporting a spring on said member so that at least part of said spring can extend through said opening.

11. A base plate as defined in claim 11 including a frame substantially surrounding said surface, the inwardly facing walls of said frame including said wall portions.

12. A base plate as defined in claim 11 including a plurality of said openings, said openings being disposed on opposite sides of the midportion of one of said facing surfaces.

13. A base plate as defined in claim 12 including a spring and, means on said spring for connecting it to said supporting means, said spring extending through some of said openings.

14. An interchangeable plate for use in a cover plate assembly comprising a rigid member defining a surface having at least one aperture through which a part of an electrical element can extend, said surface being otherwise imperforate, said member including at least two opposite edges, and a notch disposed along each of said opposite edges for engagement with corresponding projecting means on said assembly.

15. An interchangeable plate as defined in claim 14 wherein one of said notches is disposed intermediate the ends of one of said edges.

16. An interchangeable plate as defined in claim 15 wherein said surface comprises a decorative design.

17. A cover plate assembly comprising a plurality of first members and a second member, each of said first members having an aperture through which an element can extend and including wall portions having facing surfaces thereon, said aperture in each of said first members being disposed between said facing surfaces, each of said first members having a side edge in abutting engagement with the side edge of an adjoining first member and means to retain said abutting side edges in abutting engagement, said second member having at least two opposite edges and being supported on said first members with a portion of each of said opposite edges adjacent each of said facing surfaces, said second member having a plurality of apertures through which elements can extend, and resilient means disposed between said first and second members for resiliently and releasably urging said second member against one of said facing surfaces of each of said first members so that said second member is releasably retained on said first members with said apertures in said first members being aligned with said apertures in said second member.

18. A base plate as defined in claim 10 including a spring and means on said spring for connecting it to said supporting means, at least part of said spring extending through said opening.

\* \* \* \* \*